United States Patent [19]
Perakis

[11] Patent Number: 5,174,531
[45] Date of Patent: Dec. 29, 1992

[54] HAIR DRYER HOLDER APPARATUS

[76] Inventor: Farideh Perakis, 3901 Via Del Campo, San Clemente, Calif. 92672

[21] Appl. No.: 736,418

[22] Filed: Jul. 26, 1991

[51] Int. Cl.⁵ .............................................. A47G 29/00
[52] U.S. Cl. .................................... 248/124; D28/17; 248/286
[58] Field of Search ............... 248/124, 132, 284, 286, 248/291, 296, 354.5, 106, 188.5, 161; 34/101; 219/242, 222; D28/17

[56] References Cited

U.S. PATENT DOCUMENTS

| | | |
|---|---|---|
| D. 70,024 | 4/1926 | Meyer. |
| D. 70,667 | 7/1926 | Gross. |
| D. 123,594 | 11/1940 | Frisbie et al. |
| D. 247,981 | 5/1978 | Wistrand. |
| D. 253,305 | 10/1979 | Battaglia. |
| D. 261,818 | 11/1981 | Galuppo. |
| D. 294,530 | 3/1988 | Carluccio et al. |
| D. 302,052 | 7/1989 | Plaut. |
| 2,470,694 | 5/1949 | Foo .............................. 248/124 X |
| 2,557,570 | 6/1951 | Seiger ........................... 248/106 X |
| 2,681,782 | 6/1954 | Morishita ........................... 248/106 |
| 2,806,416 | 9/1957 | Jones, Jr. ..................... 248/188.5 X |
| 3,229,940 | 1/1966 | Kagels .......................... 248/354.5 X |

Primary Examiner—Ramon O. Ramirez
Attorney, Agent, or Firm—Henry M. Bissell

[57] ABSTRACT

A hair dryer holder apparatus which is light in weight, durable and efficient, and is fully adjustable for releasably holding a dryer. The holder includes a horizontal ring base and a pair of spaced vertical telescoping posts, to the upper ends of which are hinged a pair of adjustable arms which are angled generally toward each other. The arms have grippers on their free ends which releasably hold two portions of the dryer e.g., the handle and nozzle, at any desired angle for the convenience of the user. The hinges may be releasably locked into position or be frictional joints. The grippers may each have a pair of spaced jaws. In one embodiment the jaws are flexible and resilient. In another embodiment they are movable by a screw or bolt driven toward and away from each other. The telescoping posts can have lock rings or transverse lock pins.

26 Claims, 2 Drawing Sheets

ABSTRACTNOTREQUIRED

HAIR DRYER HOLDER APPARATUS

BACKGROUND OF THE INVENTION

1. Field of the Invention

The present invention generally relates to electrical appliances and to support devices for the same and, more particularly, to an improved hair dryer holder and an improved assembly incorporating the holder and a portable hair dryer.

2. Description of the Related Art

Various supports have been devised for holding hair dryers in a desired position. See, for example, U.S. design Pat. Nos. 70,024, 70,667, 123,594, 247,981, 253,305, 261,818, 294,530 and 302,052. All the supports depicted therein are subject to one or more of the following deficiencies. They are large and clumsy, and/or are limited in their ability to position a hair support, and/or are expensive and difficult to make.

There remains a need for an improved portable hair dryer holder which is compact, light in weight, inexpensive, durable, simple and efficient, and which can hold the dryer securely but releasably in a variety of positions and orientations to suit individual needs. Such support should be capable of fitting conventional portable hair dryers of various types and configurations.

SUMMARY OF THE INVENTION

The improved hair dryer and holder assembly of the present invention satisfies all the foregoing needs. The assembly includes a portable hair dryer and an adjustable holder for the same. The holder permits the hair dryer to be angled and releasably held in any desired position without the need for manual support for maximum hair drying efficiency.

The holder comprises a horizontal base, preferably in the form of a lightweight ring, a pair of spaced, vertical telescoping posts with their lower ends connected to the posts and their upper ends hingedly connected to a pair of arms, one per post, which arms extend toward each other and bear releasable gripping means on their free ends. Preferably, the posts have upper portions sliding within, and extending upwardly out of, lower portions and are releasably locked into a desired position with locking rings or transverse pins through matching aligned holes in the two portions. The arms can be friction fitted to the posts and are frictionally movable relative to the posts. The arms, if desired, can be releasably locked in any given position, as by a transverse threaded lock bolt.

The gripping means are each preferably generally U-shaped shaped, with a pair of spaced jaws. In one embodiment, the jaws are flexible and resilient, so as to be able to flex and frictionally engage the hair dryer. In another embodiment, the jaws are interconnected through a transverse screw or threaded bolt and are movable toward and away from each other by the screw or bolt.

The holder can be fabricated of metal, heavy duty plastic, etc. for long wear. Various other features of the assembly are set forth in the following detailed description and accompanying drawings.

BRIEF DESCRIPTION OF THE DRAWINGS

A better understanding of the present invention may be realized from a consideration of the following description, taken in conjunction with the accompanying drawings in which.

DESCRIPTION OF THE PREFERRED EMBODIMENTS

Figure 1:
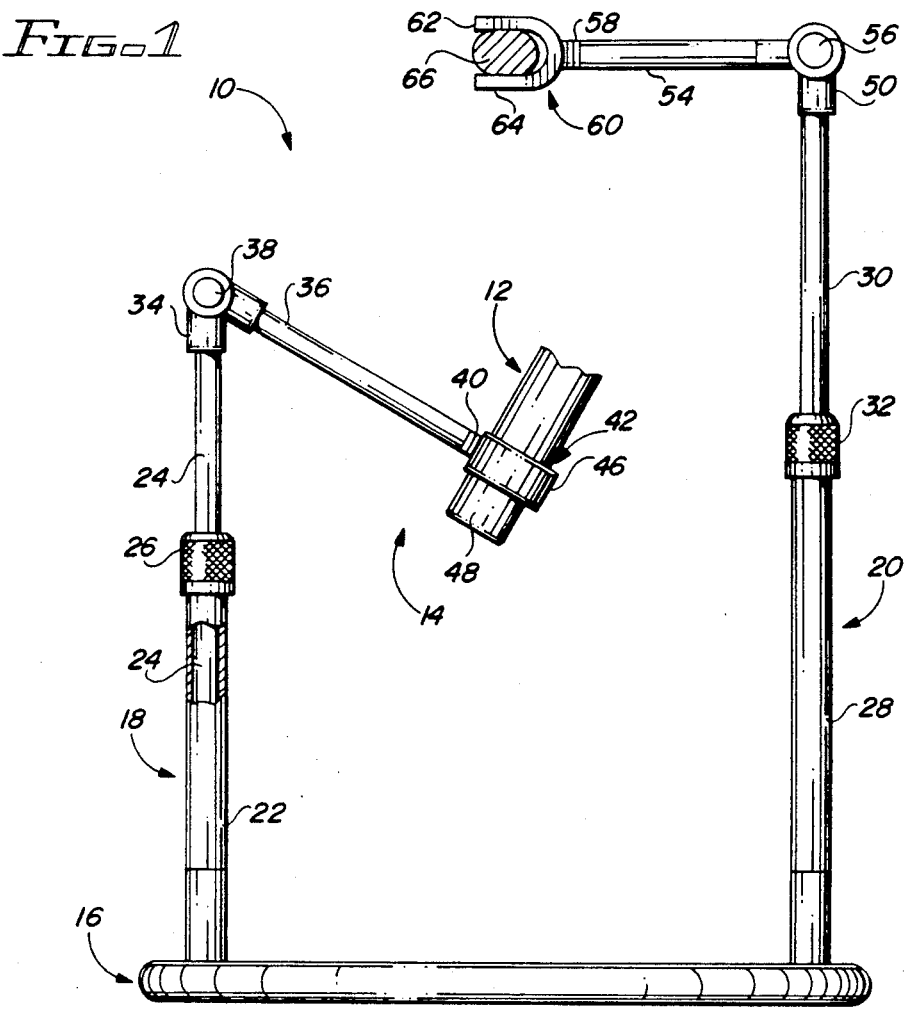
FIG. 1 is a schematic side elevation, partly broken away, of a first preferred embodiment of the improved portable hair dryer and holder assembly of the present invention.
Figure 2:
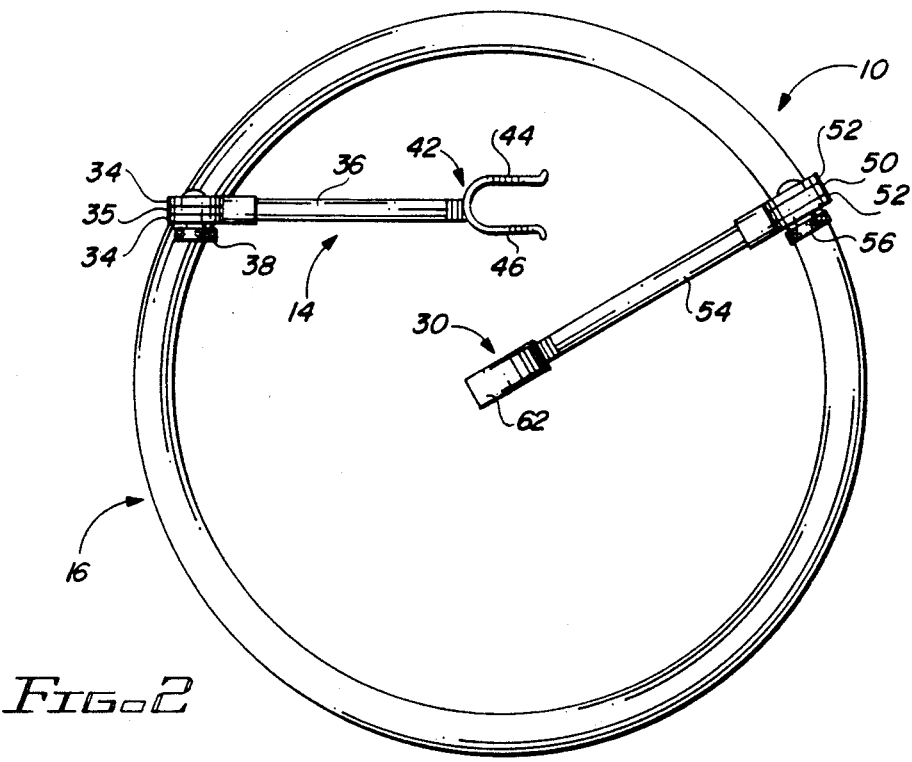
FIG. 2 is a schematic top plan view of the holder of FIG. 1.

FIGS. 1 and 2

Now referring more particularly to FIGS. 1 and 2 of the drawings, a first preferred embodiment of the improved portable hair dryer and holder assembly of the present invention is schematically depicted therein. Thus, assembly 10 is shown which comprises a conventional portable hair dryer 12 and a special holder 14 releasably holding dryer 12. Holder 14 can be fabricated of metal, such as aluminum, steel, or titanium, or of plastic, wood, ceramic or the like, and comprises a generally horizontal base preferably in the form of a ring 16, to which are integrally connected a spaced pair of generally vertical telescoping posts 18 and 20.

Post 18 comprises a hollow cylindrical tubular lower portion 22 connected to ring 16, and an upper cylindrical tubular portion 24 slidably received within the upper part of portion 22 and extending upwardly therefrom. Portion 24 can be rotated in portion 22. A conventional knurled screw-down friction collar 26 is threaded over the upper end of portion 22 so as to adjustably and releasably cinch portion 22 against portion 24 in order to hold the two portions 22 and 24 in any desired degree of extension.

When it is desired to releasably lock portions 22 and 24 together, collar 26 is screwed down on portion 22. When it is desired to unlock portions 22 and 24, collar 26 is unscrewed upon portion 22. Post 20 is identical in construction to post 18. Thus, post 20 has lower portion 28 corresponding to portion 22, upper portion 30 corresponding to portion 24 and collar 32 corresponding to collar 26.

The upper end 34 of post 18 is hinged to the rear end 35 of an arm 36 so that arm 36 can be swung up and down relative to post 18 and can be releasably locked into a desired position by a transverse threaded hinge lock bolt 38 passing through ends 34 and 35.

The free opposite end 40 of arm 36 bears releasable gripping means in the form of a generally U-shaped gripper 42 having a spaced pair of flexible, resilient jaws 44 and 46 of preferably elastomeric material such as plastic or rubber. Jaws 44 and 46 can be spread somewhat apart, as when the nozzle 48 of dryer 12 is forced therebetween. The elastic memory of jaws 44 and 46 will cause them to releasably grip nozzle 48 to hold it in place. Gripper 42 can be in fixed orientation to end 40 of arm 36, or can be engaged therewith as by a pin in recess array (not shown) so as to be frictionally rotatable therearound in order to hold any position to which it is rotated.

The upper end 50 of post 20 is equipped identically to post 18, that is, it is hinged to the rear end 52 of an arm 54 so that arm 54 can be swung up and down relative to post 20, extends toward arm 36 and can be locked into position by transverse threaded hinge lock bolt 56 spanning ends 50 and 52.

The free opposite end 58 of arm 54 bears U-shaped gripper 60 having flexible resilient jaws 62 and 64. Gripper 60 is identical to gripper 42 except that, if it is secured in a rigid position relative to end 58, it is oriented in a plane perpendicular to that of gripper 42, as shown in FIGS. 1 and 2. However, it can, if desired, be made so as to frictionally rotatable around end 58.

While gripper 42 releasably holds a portion of dryer 12, for example, nozzle 48, gripper 60 releasably holds between jaws 62 and 64 another portion of dryer 12, such as its handle 66, so that dryer 12 can be oriented in any desired position for effective use. Since portions 24 and 30 can be telescoped up and down and can be rotated, arms 36 and 54 have a wide range of orientation. This range is further extended if grippers 42 and 60 can frictionally rotate around arms 36 and 54. Thus, assembly 10 is of improved utility while being compact, inexpensive, lightweight and durable.

FIG. 3

Figure 3:
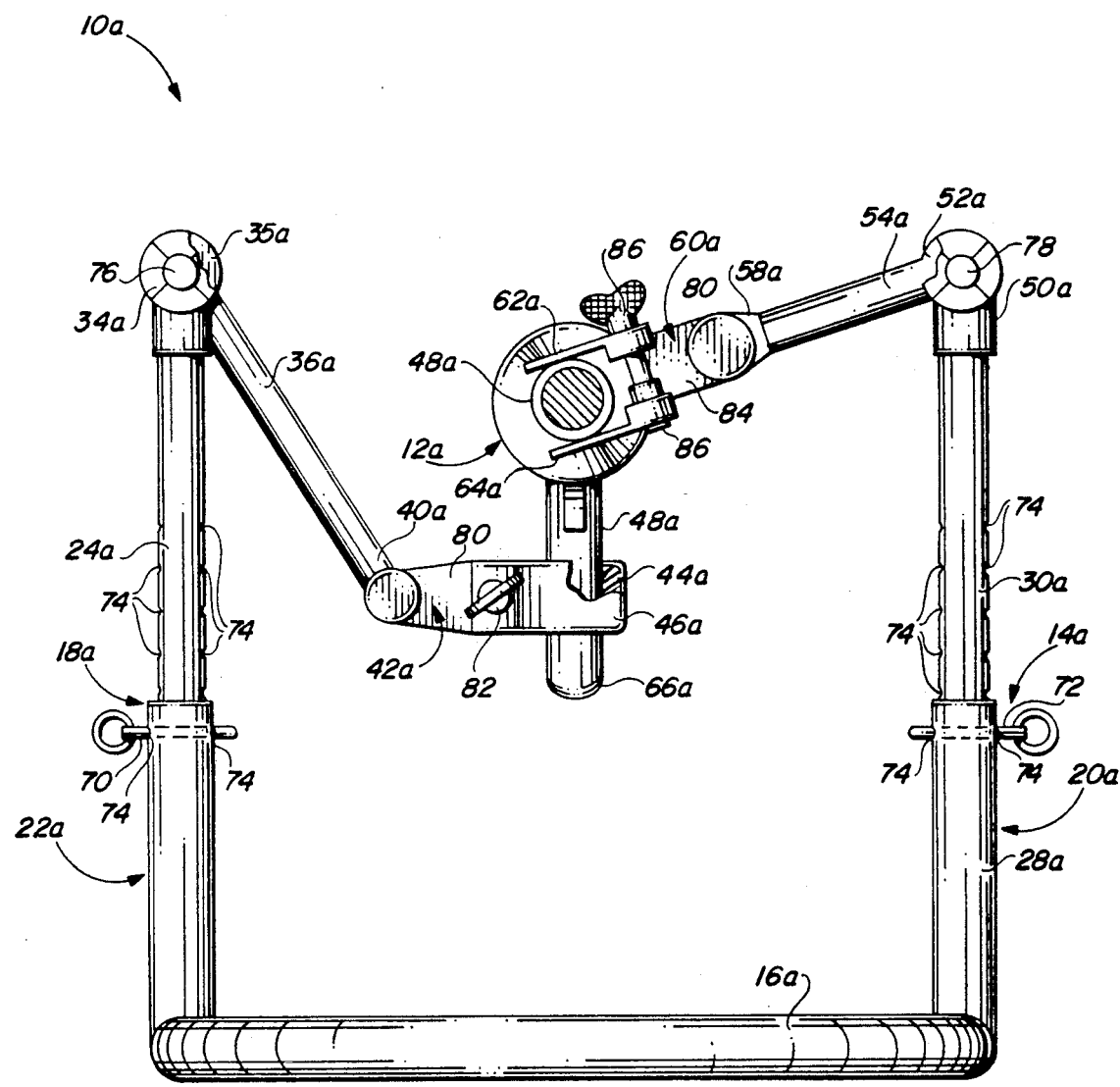
FIG. 3 is a schematic side elevation, partly broken away, of a second preferred embodiment of the improved portable hair dryer and holder assembly of the present invention.

A second preferred embodiment of the improved portable hair dryer and holder assembly of the present invention is schematically depicted in FIG. 3. Thus, assembly 10a is shown. Components thereof similar to those of assembly 10 bear the same numerals but are succeeded by the letter "a".

Assembly 10a is substantially identical to assembly 10, except as follows:

a) there are no ring collars such as collars 26 and 32, but instead, transverse lock pins 70 and 72 are present which releasably pass through aligned openings, generally designated 74, in tubes 22a, 24a, 28a and 30a, as shown in FIG. 3;

b) upper end 34a of post 18a is frictionally pivotably hinged to rear end 35a of arm 36a, arm 36a rotating around cross pin 76, no lock bolt being present; similarly, upper end 50a of post 20a is frictionally pivotably hinged to rear end 52a of arm 54a, which rotates around pin 28, no lock bolt being present; and, c) free end 40a of arm 36a is frictionally pivotably hinged to the rear end 80 of gripper 42a which is fixedly connected to jaw 46a. Jaw 44a is connected to jaw 46a by threaded cross bolt 82 so that turning of bolt 82 adjusts the spacing between jaws 44a and 46a, both of which are of inflexible material. Similarly, free end 58a of arm 54a is frictionally pivotably hinged to the rear end 84 of gripper 60a which is fixedly connected to jaw 62a. Jaw 64a is connected to jaw 62a by threaded cross bolt 86 so that turning of bolt 86 adjusts the spacing between jaws 62a and 64a, both of which are of inflexible material. Jaws 62a and 64a are shown clamped around handle 66a of dryer 12 while dryer nozzle 48a is shown clamped by jaws 44a and 46a. Assembly 10a has substantially the other advantages of assembly 10.

Various other modifications, changes, alterations and additions can be made in the improved assembly of the present invention, including the holder thereof and its components and parameters. All such modifications, changes, alterations and additions as are within the scope of the appended claims form part of the present invention.

Although there have been described hereinabove various specific arrangements of an improved hair dryer holder and dryer-holder assembly in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved hair dryer holder, said holder comprising, in combination:
   a) a base for placement on a generally horizontal support surface;
   b) a spaced pair of telescoping generally vertical posts, each having an upper and a lower end, said lower ends also being connected to said base;
   c) a pair of arms, each having a front and a rear end, the rear ends of said arms being hinged to the upper ends of said posts, said arms being angled toward each other and including means adjustably positioning said arms; and
   d) a pair of releasable gripping means connected to the front ends of said arms for gripping spaced components of a portable hair dryer to releasably hold it in a desired orientation for use.

2. The holder of claim 1 wherein said base comprises a ring.

3. The holder of claim 1 wherein each said vertical post comprises a lower portion connected to said base and a smaller upper portion telescoping within and away from said lower portion and wherein said posts bear locking means releasably holding said two portions in an adjustable location.

4. The holder of claim 3 wherein said post portions are cylindrical and said releasable locking means comprise a removable transvere pin passing through aligned openings in the overlapped section of said upper and lower portions.

5. The holder of claim 3 wherein said post portions are cylindrical and wherein said releasable locking means comprise a tapered knurled grip ring around each said post, overlapping and releasably tightening the upper end of said lower portion against the adjacent surface of said upper portion.

6. The holder of claim 1 wherein the upper ends of said posts frictionally engage the rear ends of said arms so that said arms can be manually moved but otherwise hold their position.

7. The holder of claim 6 wherein said gripping means frictionally engage said arms and are movable to a desired adjustable relative orientation.

8. The holder of claim 6 wherein said arm is releasably locked in place against said post by a threaded lock nut passing therethrough.

9. The holder of claim 1 wherein each said releasable gripping means is generally U-shaped and comprises a spaced pair of gripper jaws.

10. The holder of claim 9 wherein said spaced gripper jaws are flexible and resilient so that a portable hair dryer nozzle or handle can be slipped therebetween and held thereby.

11. The holder of claim 9 wherein said spaced gripper jaws are rigid and are interconnected by a transversely extending threaded adjuster bolt for varying the spacing between said jaws.

12. The holder of claim 9 wherein said gripper jaws are hinged to the front end of each said arm.

13. The holder of claim 9 wherein said gripper jaws are frictionally rotatably secured to said arms.

14. A portable hair dryer and holder apparatus comprising, in combination:
   a) a portable hair dryer;
   b) a generally horizontal base;
   c) a spaced pair of telescoping generally vertical posts, each having an upper end and a lower end, said lower ends being connected to said base;
   d) a pair of arms, each having a front and a rear end, the rear ends of said arms being hinged to the upper ends of said posts, said arms being adjustably angled toward each other; and
   e) a pair of releasable gripping means connected to the front ends of said arms for releasably gripping two spaced portions of said portable hair dryer to releasably hold it in a desired orientation for use.

15. The apparatus of claim 14 wherein said horizontal base comprises a ring.

16. The apparatus of claim 14 wherein each said vertical post comprises a lower portion connected to said base and a smaller upper portion telescoping within and from said lower portion, and wherein said posts bear locking means releasably holding said two portions in an adjustable location.

17. The apparatus of claim 16 wherein said posts are cylindrical and said releasable locking means comprises a removable transverse pin passing through aligned openings in the overlapped section of said upper and lower portions.

18. The apparatus of claim 16 wherein said post portions are cylindrical and wherein said releasable locking means comprises a tapered knurled grip ring around each said post overlapping and releasably tightening the upper end of said lower portion against the adjacent surface of said upper portion.

19. The apparatus of claim 14 wherein said gripping means frictionally engage said arms.

20. The apparatus of claim 14 wherein the upper ends of said posts frictionally engage the rear ends of said arms so that said arms can be moved into a desired adjustable relative orientation.

21. The apparatus of claim 19 wherein said arm is releasably locked in place against the upper end of said post by a threaded lock nut passing therethrough.

22. The apparatus of claim 14 wherein each said releasable gripping means is generally U-shaped and comprises a spaced pair of gripper jaws.

23. The apparatus of claim 22 wherein said spaced gripper jaws are flexible and resilient so that said portable hair dryer nozzle and handle are slipped therebetween and held thereby.

24. The apparatus of claim 22 wherein said spaced gripper jaws are rigid and are interconnected by a transversely extending threaded adjuster bolt for varying the width between said jaws.

25. The apparatus of claim 14 wherein said gripping means comprise gripper jaws which are hinged to the front end of each said arm.

26. The apparatus of claim 25 wherein said gripper jaws are frictionally and rotatably secured to said arms.

* * * * *